Dec. 30, 1941.  H. HOLUBOW  2,268,212
VOLTAGE REGULATING MEANS
Filed Feb. 6, 1939  2 Sheets-Sheet 1
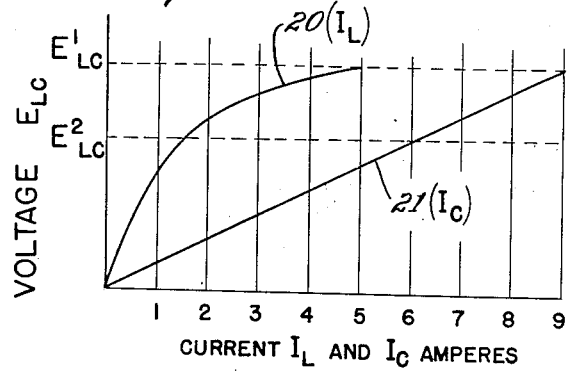
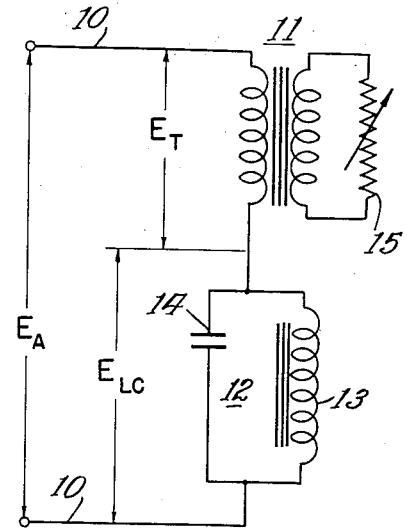
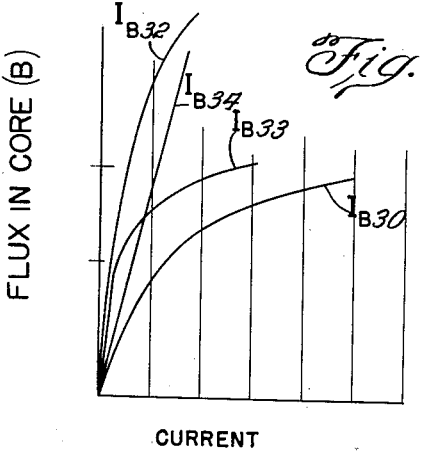
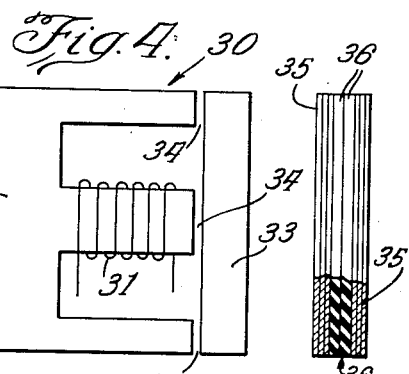
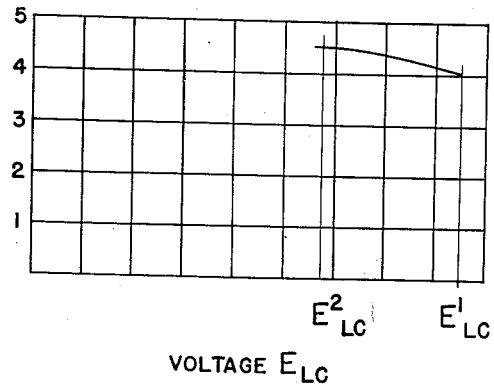
Inventor:
Harry Holubow.
By: Jesch and Darbo
Att'ys.

Inventor:
Harry Holubow
By:- Jesch and Darbo
Att'ys.

Patented Dec. 30, 1941

2,268,212

UNITED STATES PATENT OFFICE 2,268,212

VOLTAGE REGULATING MEANS

Harry Holubow, Chicago, Ill., assignor to Thordarson Electric Manufacturing Company Application February 6, 1939, Serial No. 254,904

9 Claims. (Cl. 171—119)

This invention relates to power transformation apparatus, and particularly to apparatus for regulating the output voltage whereby relatively wide variations may occur in the input voltage and in the magnitude of the load without causing the output voltage to vary to any substantial degree.

Output voltage regulating power transformation apparatus heretofore known has been adapted to provide output voltage regulation in the presence of variations in input voltage. It is the object of the present invention to provide improved apparatus of this character which is capable of maintaining the output voltage substantially constant in applications where wide variations in input voltage, or in the magnitude of the load, or in both input voltage and load, are encountered.

Briefly, this is accomplished by connecting in series with the supply line and the primary of the load transformer a reactance comprising parallel connected inductance and capacity elements capable of maintaining the current through said transformer primary at predetermined values for different values of voltage applied to the reactance within the operating range, and constructing the load transformer in such manner that its exciting current is relatively large and undergoes relatively large variations with small variations of voltage impressed upon the transformer within the operating range.

In the drawings:

Fig. 1 is a circuit diagram for the invention;

Fig. 2 is a set of curves showing the current-voltage relationship in the elements of a reactance employed in the invention;

Fig. 3 is a second curve showing the same relationship for the entire reactance;

Figs. 4 and 5 are a diagrammatic side view and an end view respectively, of an inductance element employed in the invention;

Fig. 6 is a set of curves showing current-flux relationships in the inductance element of Figs. 4 and 5;

Figure 7:
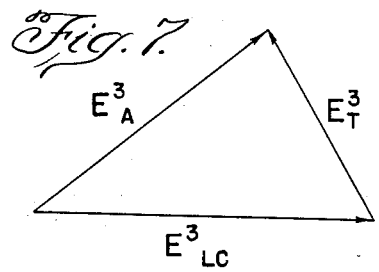
Figs. 7 and 8 are vector diagrams illustrating the relationships between the voltages of different members of the apparatus under different supply voltage conditions, the load remaining the same.

In the arrangement illustrated in Fig. 1, the supply conductors 10 are connected to a suitable source of alternating current energy and are connected in series with the primary current energy and are connected in series with the primary of the load transformer 11 and the reactance 12 comprising the parallel connected inductance 13 and condenser 14. The secondary of the transformer 11 is connected to a load, which may be variable, and which is represented by the variable resistance 15. While a resistive load is indicated, it is understood that it need not be a pure resistance, but may include inductance and capacity.

The characteristics of the reactance 12 are such that predetermined values of current are present in the primary of the transformer 11 for different values of voltage applied to the reactance by the supply within the operating range. In general, it may be said that the current is maintained substantially constant, but for more exact regulation the current values are caused to decrease slightly with increase of voltage applied to the reactance, for reasons which will be pointed out hereinafter.

To obtain these characteristics from the reactance 12, the characteristics of the inductance 13 and condenser 14 individually are arranged to be substantially as represented by the curves of Fig. 2 in which the voltage applied to the reactance, $E_{LC}$, is represented upon the ordinates and the current values through the inductance ($I_L$) and through the condenser ($I_C$) are represented on the abscissae. Curve 20 represents the characteristics of the inductance and curve 21 those of the condenser. The curve for the ordinary inductance is convex upwardly throughout the entire range, but for this invention the portion of the curve within the operating range is substantially straight. The curve 21 for the condenser is a straight line. The straight portion of curve 20 is caused to approach curve 21 in a slight degree with increasing applied voltages. The current in the portion of the circuit externally of the reactance is the geometric or vectorial sum of the currents in the inductance and condenser. Neglecting the small components due to the resistance losses, these currents are in opposite phase relation to each other, and the current in the external circuit is the arithmetical difference between them. Specific values of current suitable for a practicable embodiment of the invention are shown in Fig. 2 by way of example. It is seen that when the voltage upon the reactance equals $E^1_{LC}$, the current in the external circuit is the difference between $I^1_C$ and $I^1_L$, which is 9 minus 5.0 or approximately 4.0 amperes; and when the voltage is $E^2_{LC}$, the external current is 6 minus 1.5 or 4.5 amperes. The curve of Fig. 3 shows the resultant current $I_{LC}$ of the reactance. The difference between $E^1_{LC}$ and $E^2_{LC}$ represent the voltage operating range of the reactance 12 and is substantial, and the slight decrease in current with increase in voltage $E_{LC}$ is intended to be included in the term "substantially constant current" when that term, or a similar term is used in the specification and claims. The current $I_{LC}$ is also the current $I_T$ through the primary of transformer 11. Since $I_C$ is greater than $I_L$, the current $I_T$ in the primary of transformer 11 is in leading phase relation with respect to the voltage.

To obtain the shape of curve 20 shown in Fig. 2, the inductance 13 is constructed so as to have predetermined values which will lie on the curve 20. It is understood that in actual manufacture a close approximation is all that is usually required, and it is not necessary to reproduce the curve exactly. To accomplish this the inductance 13 is constructed as is illustrated in Figs. 4 and 5. This comprises an iron core 30 which is made up of three elements; the three-legged E-section 32 in which the cross-sectional area of the central leg is substantially equal to the sum of the areas of the two outer legs, the single-legged I-section 33 which is of smaller cross section than the outer legs of the E-section, and the small air gaps 34 which may consist of mechanical spacers of electrical insulating material or mere butt joints between the different sections. These air gaps are considered magnetically as being a single element. In fact, a single gap between the I-section and the central leg of the E-section may be substituted for the three gaps shown. The I-section 33 may be constructed as illustrated in Fig. 5. It is composed of laminations 35 of steel, some of the laminations being omitted and laminations of non-magnetic, electrically insulating material 36 being substituted. Winding 31 threads the central leg of the E-section 32.

The device is operated in such a manner that the E-section 32 is at an unsaturated point of its permeability curve, and the flux increases at about the same rate as the current in the winding 31, while the I-section 33 is at or approaching the saturation point of its permeability curve, and a slight increase in flux requires a large increase in current. The current required for the gap increases as a straight line with increase in flux. Curves showing the values of current required to produce different values of flux in the different sections of the core are shown in Fig. 6, curves $I_{B32}$, $I_{B33}$ and $I_{B34}$ representing the current for the elements 32, 33 and 34 respectively. Curve $I_{B34}$ represents the relationship for the total air gap made up of the three gaps 34. At any instant the flux threading the three elements is substantially the same, and the current required to produce it is the sum of the currents required to produce it in the different elements. This is represented by curve $I_{B30}$. The curve $I_{B30}$ is substantially a straight line within the operating range of the apparatus. The flux in the core is directly proportional to the voltage upon the core and curve 20 of Fig. 2 is shown as having the same slope as curve $I_{B30}$ of Fig. 6. It is understood that such slopes depend upon the scales of values chosen, and the same slopes are used merely to facilitate the description of the invention.

Figure 8:
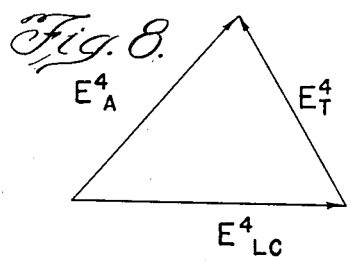

With the load 15 remaining constant, and the current remaining substantially constant as represented upon Fig. 3, it is clear that with variations of voltage $E_A$ between the supply conductors 10, the voltage across the primary of the load transformer 11 remains substantially constant. Variations in the voltage $E_{LC}$ across the reactance 12 take place to compensate for variations of the supply voltage $E_A$. Figs. 7 and 8 illustrate the variations in vectorial relations which occur with a change in $E_A$. $E_T$, and the phase angle between $E_T$ and $E_{LC}$, remain constant and $E_{LC}$ decreases in magnitude from $E^3_{LC}$ to $E^4_{LC}$ and the phase angle between $E_A$ and $E_{LC}$ increases when $E_A$ decreases from $E^3_A$ to $E^4_A$.

Variations in the load 15, however, will produce variations in the voltage $E_T$ upon the load transformer unless means are provided to compensate for such variations. For example, if an ordinary load transformer were used, in which the exciting current is relatively small, if the resistance of the load 15 were decreased or if a load-consuming device were added across the secondary of transformer 11 to an existing load, under conditions which might be expected to cause an increase in the load, the reactance 12 would maintain the current $I_T$ substantially constant and the voltage $E_T$ across the transformer would decrease. As a result, the power load, instead of increasing, would actually decrease. The voltage $E_{LC}$ across the reactance 12 would automatically adjust itself in magnitude and phase angle to accommodate the change in voltage across the load transformer.

Figure 9:
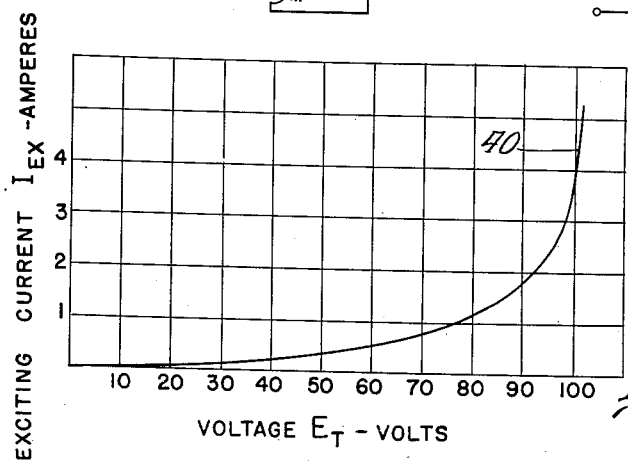
Fig. 9 is a curve illustrating the relationship between impressed voltage and exciting current in the load transformer employed in the invention.

According to this invention, means are provided for allowing the load to be increased and decreased in the usual manner, and at the same time maintaining the transformer voltage substantially constant with varying loads. For this purpose, the transformer is constructed so as to have relatively large exciting current, and to undergo relatively large exciting current changes with small changes in impressed voltage. Means for providing such characteristics are known, one of them being a design of transformer whereby it operates at high flux density. For example, where an ordinary transformer is designed to operate in the neighborhood of 10,000 lines per square centimeter flux density, the transformer suitable for this invention is designed to operate at a flux density considerably greater than this. With such design, the curve representing the exciting current, ($I_{EX}$) corresponding to different values of voltage ($E_T$) impressed upon the primary of the transformer 11 is as is shown in Fig. 9. Specific values of voltage and exciting current are set forth, suitable for carrying forward the example represented in Figs. 2 and 3. The desired operating voltage of the transformer is 100 volts and in the range proximate to this voltage the exciting current is relatively large and substantial variations therein accompany relatively small variations in voltage. As explained heretofore, if the ordinary transformer were used in which variations in voltage are accompanied by small variations in exciting current, variations in load conditions would be accompanied by relatively large variations in transformer voltage because substantially all of the current is power current and this is maintained substantially constant by the reactance 12, leaving the voltage as the factor which must vary. It is understood that the term "load" contemplates the power load and is not intended to include the exciting current.

By providing a transformer having relatively large exciting current, increases in the load current through the operating range may be compensated for by decreases in the exciting current, and vice versa, whereby the total current through the primary of the transformer remains substantially constant. This conforms to the substantially constant current conditions which are maintained by the reactance 12. By constructing the transformer so that large changes in exciting current accompany small changes in voltage, the variations in exciting current result in but slight variations in voltage across the transformer primary whereby this voltage is maintained substantially constant.

Figure 10:
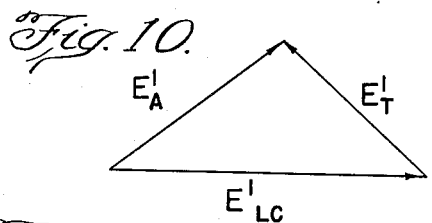
Figs. 10 and 11 are vector diagrams illustrating relationships between the voltage of different elements of the invention under different load conditions, the supply voltage remaining the same.
Figure 11:
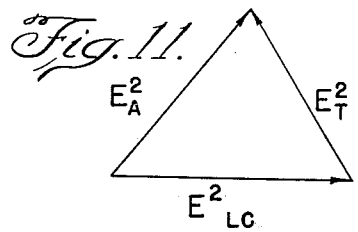

Fig. 9 illustrates the relationships which may be developed into a working arrangement. Assume first that the reactance 12 is adapted to deliver an exactly constant current of 4 amperes through the primary of the transformer 11 over the reactance voltage operating range from $E^1_{LC}$ to $E^2_{LC}$, and the current does not follow the curve of Fig. 3. At no load, this current is all exciting current, the copper and hysteresis losses being negligible for the purposes of this illustration. According to the curve 40 of Fig. 9, when the exciting current is 4.0 amperes the voltage $E_T$ across the primary of transformer 11 is 100 volts. The vectorial relationship of the voltages is illustrated in Fig. 10. Assuming now that a load is placed upon the transformer resulting in a load current of 2 amperes through the primary of transformer 11. The exciting current lags the load current by 90° phase displacement. The reactance 12 operates to maintain the resultant or total current through the primary of transformer 11 at 4 amperes. The exciting current is therefore $\sqrt{4^2-2^2}=3.47$ amperes. The reduction of exciting current is from 4 to 3.47 amperes. The resulting voltage across the primary of transformer 11 is 99.5 volts, (see Fig. 9) which is but a slight variation from the no load voltage of 100 volts. Assuming again that the load is increased so that the load current through the primary of transformer 11 is 3.0 amperes. This results in an exciting current of $\sqrt{4^2-3^2}=2.65$ amperes, and the resulting voltage is 97 volts. In this last example, the load approaches the maximum which the arrangement is capable of carrying, since the total current through the transformer may not exceed 4 amperes, and the resulting reduction in voltage is not more than 3%. The vectorial relationship of the voltages for the last load condition is illustrated in Fig. 11. The magnitude of $E_A$ and $E_T$ remains substantially the same as in Fig. 10, the change being accommodated by changes in the phase angles and the magnitude of $E_{LC}$ which has decreased from $E^1_{LC}$ to $E^2_{LC}$.

The advantage resulting from the characteristic of the reactance 12 in providing a slightly decreasing current through transformer 11 with increase of applied voltage as illustrated by Fig. 3 will now be described. Under no load conditions the voltage $E_{LC}$ is at the value $E^1_{LC}$, as in the preceding example, and the current in the external circuit is 4.0 amperes (see Fig. 3), which is substantially all exciting current for transformer 11, and, by reference to the curve of Fig. 9, the voltage $E_T$ upon transformer 11 is 100 volts. Under the load condition represented by Fig. 11, the value of $E_{LC}$ is $E^2_{LC}$ and the current in the external circuit is 4.4 amperes. The exciting current is $\sqrt{4.4^2-3^2}=3.2$ amperes, and the voltage $E_T$ impressed upon transformer 11 is approximately 98.5 volts. When $I_{LC}$ remains constant for varying values of $E_{LC}$ the values of $E_T$ in accordance with the preceding example, is 97 volts under similar load conditions. The drooping current characteristic illustrated in Fig. 3, therefore, compensates partially for the slight decrease in voltage upon transformer 11 with increase in load and can be made to compensate entirely for such reduction.

The invention is described by explaining how regulation is accomplished, first while the supply voltage varies and the load remains constant, and second, while the load varies and the supply voltage remains constant. However, it is understood that regulation is obtained as well when variations occur in both substantially simultaneously.

Figure 12:
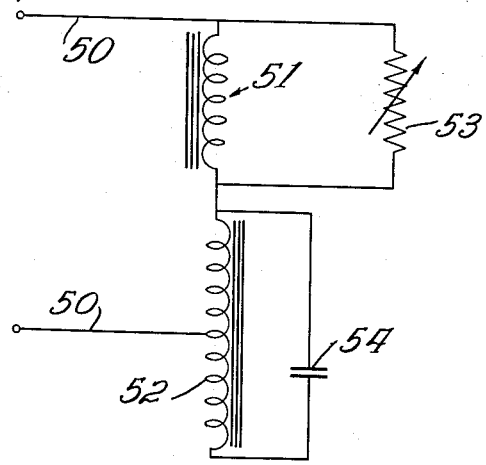
Figs. 12 and 13 are circuit diagrams for modifications in the invention.

In Fig. 12 a modification of the invention is illustrated in which the load transformer is replaced by an inductor, and the inductance of the reactance member is in the form of an autotransformer. The supply conductors 50 are connected in series with the inductor 51 and the primary of the autotransformer 52. The variable load 53 is connected across the inductor 51 and the condenser 54 is connected across the secondary of the autotransformer 52. The autotransformer 52 and condenser 54 form a reactance which is adapted to maintain predetermined values of current in inductor 51 in substantially the same manner as reactance 12 of Fig. 1 does in the primary of transformer 11.

Figure 13:
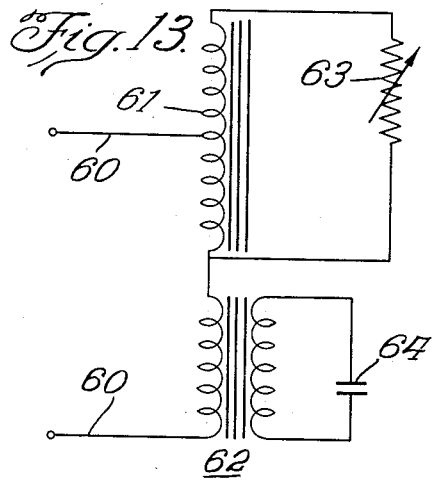

In Fig. 13 a further modification is illustrated in which the load transformer is an autotransformer and the inductance of the reactance member is in the form of a transformer having separate primary and secondary windings. The supply conductors 60 are connected in series with the primary windings of autotransformer 61 and transformer 62. The variable load 63 is connected to the secondary of autotransformer 61, and condenser 64 is connected across the secondary of transformer 62.

The operation of the modifications shown in Figs. 2 and 3 is substantially the same as that of the form illustrated in Fig. 1.

The invention is adapted for a large number of applications for supplying substantially constant output voltage where both load variations and supply voltage variations are encountered, such as for the filament energy supply for space discharge tubes, including vacuum tubes and gaseous discharge tubes, rectifiers, photometric measuring devices, production testing and control apparatus, and many other applications. It is particularly advantageous where it is desired to maintain constant calibration throughout a series of operations. While the invention provides output voltage regulation for variations in supply voltage and magnitude of the load its usefulness is not confined to applications where the voltage and load fluctuate. The value of the invention may reside in enabling the user to connect the apparatus to different supply outlets, where the voltage is at different values, or to connect different loads to the output of the apparatus. Such an available source of constant voltage is highly useful for comparative experimentation, calibration, and many other uses.

The invention may also be employed to advantage where the supply voltage is constant and regulation is required for varying load only. In such case the current in the primary of the load transformer need not be substantially constant and may be caused to decrease in greater degree with increasing voltage upon the reactance 12 if that is required to compensate for decreases in the exciting current with increases in the load.

The invention may be employed to advantage where the load is constant and variations are encountered in the supply voltage only. The large changes in exciting current with small changes of voltage upon the load transformer render it unnecessary to provide an exactly constant current in the load transformer primary, because small changes result in substantially no variation in the transformer voltage. In commercial manufacture it may be difficult and costly to secure exactly constant current characteristics which would be necessary if an ordinary load transformer were provided. At the present time output voltage regulating power transformation equipment for use with varying supply voltage is designed for loads of specific known values and can be used with loads which differ in magnitude therefrom only within narrow limits. With the present invention, the same apparatus is adapted for use with loads of widely different values, and the manufacturer needs only to know that the load is within this relatively wide range, and the user can use the same equipment with different types of load. The invention provides the advantage that constant voltage is maintained in the primary of the supply transformer which makes it possible to employ the invention where different voltages are desired at the secondary, which may be obtained by well-known means, such as multiple-tap secondaries. In addition the current through the transformer leads the voltage in phase relation, and thus provides a leading power factor and tends to correct for the lagging power factor conditions often found in power consuming apparatus.

It is understood that variations may be made in the execution and design of the system without departing from the scope of the invention. In addition, the characteristics need not be exactly as they are shown on the curves of the drawings, it being readily understood that variations in the characteristics may be made while preserving the principles and advantages of the invention.

I claim:

1. Voltage regulating power supply apparatus comprising an inductance member having a large exciting current and undergoing large changes in exciting current with small changes in voltage within the operating range, means for connecting a utilizing circuit across said inductance member, and a reactance connected in series with said inductance member and a source of alternating current, said reactance consisting of capacity and inductance members connected in parallel with each other, said parallel connected capacity and inductance members individually having voltage-current curves which are approximately parallel to each other throughout the operating range.

2. The apparatus of claim 1 in which the inductance member of the reactance is an autotransformer.

3. The apparatus of claim 1 in which the inductance member of the reactance is a transformer, the primary winding of said transformer being connected in series with the first inductance member and the source of alternating current, and the secondary winding of said transformer being connected in parallel with the capacity member.

4. Voltage regulating power supply apparatus, comprising a load transformer having a large exciting current and undergoing large changes in exciting current with small changes in voltage within the operating range, and a reactance connected in series with the primary winding of said transformer, said reactance consisting of capacity and inductance members connected in parallel with each other, said capacity and inductance members individually having voltage-current curves which are approximately parallel to each other throughout the operating range.

5. The apparatus of claim 3 in which the inductance member is an autotransformer.

6. The apparatus of claim 3 in which the inductance member is a second transformer, the primary winding of said second transformer being connected in series with the primary winding of the load transformer, and the secondary of said second transformer being connected in parallel with the capacity member.

7. Voltage regulating power supply apparatus, comprising a load transformer having a large exciting current and undergoing large changes in exciting current with small changes in voltage within the operating range, and a reactance connected in series with the primary winding of said transformer, said reactance consisting of capacity and inductance members connected in parallel with each other, said capacity and inductance members individually having voltage-current curves which are approximately parallel to each other throughout the operating range, the values of current in the capacity member exceeding those in the inductance member for the same values of voltage.

8. Voltage regulating power supply apparatus for obtaining substantially constant output voltage with varying conditions of both input voltage and load, comprising a load transformer having a large exciting current and undergoing large changes in exciting current with small changes in voltage within the operating range, and a reactance connected in series with the primary winding of said load transformer, said reactance consisting of capacity and inductance members connected in parallel with each other, said inductance member comprising a substantially closed core of metal laminations, said core having an air gap therein and at least one leg of said core operating at higher flux density than the other legs, said capacity and inductance members individually having voltage-current curves which are approximately parallel to each other throughout the operating range.

9. The apparatus of claim 8 in which the leg of the core of the inductance member which operates at higher flux density has a number of metal laminations omitted therefrom to reduce the effective cross-sectional area thereof.

HARRY HOLUBOW.

CERTIFICATE OF CORRECTION.

Patent No. 2,268,212.                                                   December 30, 1941.

HARRY HOLUBOW.

It is hereby certified that error appears in the printed specification of the above numbered patent requiring correction as follows: Page 1, second column, lines 9, 10 and 11, strike out the words "current energy and are connected in series with the primary"; page 4, second column, lines 24 and 26, claims 5 and 6 respectively, for the claim reference numeral "3" read --4--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.